（12）United States Patent
Olsen

(10) Patent No.: US 7,197,654 B2
(45) Date of Patent: Mar. 27, 2007

(54) METHOD AND APPARATUS FOR MANAGING LOW POWER PROCESSOR STATES

(75) Inventor: Claus Michael Olsen, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 10/122,875

(22) Filed: Apr. 11, 2002

(65) Prior Publication Data

US 2003/0196127 A1    Oct. 16, 2003

(51) Int. Cl.
G06F 1/32    (2006.01)
(52) U.S. Cl. .................... 713/323; 713/320
(58) Field of Classification Search ............ None
See application file for complete search history.

(56) References Cited

U.S. PATENT DOCUMENTS

| | | | | |
|---|---|---|---|---|
| 5,832,283 | A | | 11/1998 | Chou et al. ............. 395/750.01 |
| 5,926,640 | A | * | 7/1999 | Mason et al. ............... 713/320 |
| 6,065,123 | A | * | 5/2000 | Chou et al. .................. 713/322 |
| 6,079,025 | A | * | 6/2000 | Fung ........................... 713/323 |
| 6,089,456 | A | * | 7/2000 | Walsh et al. ............ 235/472.01 |
| 6,598,170 | B1 | * | 7/2003 | Nagashima .................. 713/340 |
| 6,658,576 | B1 | * | 12/2003 | Lee ............................ 713/320 |
| 6,672,963 | B1 | * | 1/2004 | Link ............................. 703/26 |
| 6,816,977 | B2 | * | 11/2004 | Brakmo et al. ............. 713/323 |
| 2003/0079152 | A1 | * | 4/2003 | Triece ......................... 713/322 |

OTHER PUBLICATIONS

N.Kamijoh et al, "Energy trade-offs in the IBM Wristwatch computer", ISWC'01, Zurich, Oct. 2001.

Martin Schwidefsky, "No 100 HZ timer!", http://lwn.net/2001/0412/a/ibm-timer.php3"http://lwn.net/2001/0412/a/ibm-timer.php3.

George Anzinger, "No HZ tick test", http://sourceforge.net/project/shownotes.php?release_id=46217"http://sourceforge.net/project/shownotes.php?release_id=46217.

ITTC, University of Kansas, "Micro-Second Resolution Timers for Linux", http://www.ittc.ukans.edu/utime/ http://www.ittc.ukans.edu/utime.

William R. Hamburgen et al., "Itsy: Stretching the Bounds of Mobile Computing", Computing Practices, Computer, 0018-9162/01, Apr. 2001, IEEE, pp. 28-36.

Intel® StrongARM* SA-1110 Microprocessor Brief Datasheet. http://www.intel.com/design/strong/datashts/278241.htm.

CIRRUS LOGIC®, EP7211 Preliminary Data Sheet, Cirrus Logic, Inc., DS352PP3, Jul. 2001, pp. 1-164, http://www.cirrus.com.

* cited by examiner

*Primary Examiner*—Rehana Perveen
*Assistant Examiner*—Anand B. Patel
(74) *Attorney, Agent, or Firm*—Michael J. Buchenhorner; Casey P. August

(57) ABSTRACT

A method and apparatus for managing power consumption of a processing unit having an operating system (OS) or software system and access to at least one hardware timer saves power by putting the processing unit into one of at least two low power states when the OS or software system is not expected to do work. A time period for which the software system is not expected to perform work is determined, and a determination is made as to which one of at least two low power states to put the processing unit in, in response to the time period. The hardware timer is configured to facilitate waking up the software system or OS in time for it to perform expected work. The processing unit and software system are transitioned into the chosen low power state. They are transitioned out of the low power state in response to a hardware interrupt.

27 Claims, 1 Drawing Sheet

METHOD AND APPARATUS FOR MANAGING LOW POWER PROCESSOR STATES

BACKGROUND OF THE INVENTION

1. Technical Field

The present invention relates generally to power management for the software systems of portable or mobile devices. In particular, the present invention provides a method and apparatus for using low power states of a processor to extend battery life.

2. Description of Related Art

Mobile and wireless communications technologies have given rise to the proliferation of handheld and portable devices with computing capabilities, such as, for example, personal digital assistants and pocket computers. Devices such as these use small batteries for their operation instead of direct connections to power supplies. Because the batteries of portable and mobile devices tend to discharge relatively quickly, energy consumption and power management are key considerations in the design of such devices.

Some devices incorporate system-on-a-chip microprocessors that provide advanced integrated power management. In such systems, the processor is put into a low power state when no applications are active and when no tasks or interrupt routines need servicing. One of the most commonly used low power states is referred to as the "idle" state. When the processor is in idle state it stops executing instructions. The processor may be reactivated or brought out of idle upon the occurrence of some event, such as the expiration of a hardware timer, or the detection of a keyboard press or other hardware interface interrupt. The event or interrupt causes the processor to transition out of the low power state and service the interrupt. By putting the processor into the idle state, battery life may be extended, particularly in systems in which the power consumed by the processor is significant compared to that of other components such as display and memory components.

Known system-on-a-chip microprocessors include the Cirrus Logic® EP7211 microprocessor, available from Cirrus Logic, Inc., and the Intel® StrongARM SA1100 microprocessor, available from Intel Corporation. These processors find widespread application in high-end mobile and portable products. Processors such as the EP7211 and SA1100 have an operating state, wherein the device operates at full performance, and two low power states, which will be referred to herein as IDLE and SLEEP states. In IDLE state, the clock to the central processing unit (CPU) core is halted while awaiting an event such as a keyboard press to generate an interrupt. In SLEEP state, on the other hand, the clock to most of the peripheral functional blocks on the chip is further stopped. An event such as a keyboard press, however, can wake up the processor from SLEEP state.

Power consumption for system-on-a-chip microprocessors varies considerably depending upon the processor's power state. Typical rates of power consumption for the Cirrus Logic® EP7211, for example, are 40 milliwatts (mW) in OPERATION state (with an 18 megahertz (MHz) CPU clock), 15 mW in IDLE state (18 MHz CPU clock), and 0.012 mW in SLEEP state. As these rates indicate, SLEEP state enables the processor to consume comparatively little power.

In a system that spends most of its time idling, it may be desirable to take advantage of SLEEP state, reduce power consumption, and thereby extend battery life. Current operating systems, however, take advantage of SLEEP state in only two situations, namely: (1) when the user powers off the device; and (2) whenever the high-level power management function determines that the device should be turned off, for example, due to user inactivity. Known devices such as Compaq Computer Corporation's Itsy Pocket Computer and the Palm™ Pilot, by way of example, implement SLEEP state in these ways. Known operating systems do not take advantage of the low power consumption of SLEEP state while the system is on. Instead, current operating systems use IDLE state to reduce power consumption while the system is on, as explained below. If a system is not being actively used by a user while the device is on, however, a great deal of battery power is wasted while the processor sits in IDLE state. Thus, a need exists for the ability to put a processor in SLEEP state, with its comparatively low power consumption, while the system is in use, to conserve battery power.

Known devices, operating systems and processors do not exercise SLEEP state in place of IDLE state, and the reason is partly due to the relatively long amount of time it takes for the processor to transition out of SLEEP state. The transition time for the EP7211 processor to come out of SLEEP state, for example, may be as long as 250 milliseconds (msec). The StrongARM SA 1100 exhibits transition times that range from 10 msec to 160 msec. Transitioning out of IDLE state, on the other hand, takes only a few CPU clock cycles, i.e., comparatively little time. The length of the transition time out of SLEEP state is critical in view of one of the most basic features of practically any operating system (OS): namely, the periodic timer interrupt. The timer interrupt is used for updating kernel time, process/task times, check queues and running the software timer call back list. The detailed operation of the timer interrupt is known to anyone skilled in the art of systems programming. Typically, the OS timer interrupt interval ranges from 1 msec to 50 msec. The sum of the time deviations associated with transitioning into and out of a low power mode (i.e., the total transition time) must be smaller than the timer interrupt interval. For example, suppose an OS is expected to be interrupted 100 times per second by a timer interrupt, i.e., the interrupt interval is 10 msec, but the total low power transition time is more than 10 msec. In this case, the internal time keeping would be severely compromised, since the interrupt no longer represents a 10 msec time lapse, as assumed by the kernel. Similarly, the updating of process times would be incorrect, as this is also based on the assumption of a 10 msec time lapse.

To take advantage of the power savings offered by SLEEP state, it would be desirable to use an operating system or software system that is not compromised by the transition time delays associated with toggling low power states. One type of operating system that is able to handle this sort of time delay is one that incorporates a work dependent timing routine. The term "work dependent", as used herein, means that the OS is interrupted only when there is work to be done, such as, for example, when the hardware timer expires or when the user makes a touchscreen press. A basic feature of a work dependent timing routine is the utilization of a dynamically adjustable timer interrupt interval, as opposed to a periodic timer interrupt interval. In a work dependent timing routine, the hardware timer is reprogrammed to interrupt the processor at a specific time in the future when the OS knows that work will need to be done. Thus, in an OS with a work dependent timing routine, the interval between timer interrupts may be quite large. If the interval is large enough, the processor could be put into SLEEP state between timer interrupts in order to achieve significant power savings without compromising the operation of the OS, or the functionalities of the system.

Further note that with a work dependent timing scheme, the energy consumed during execution of the timer interrupt handler associated with the skipped timer ticks is also saved. Also, any energy associated with transitioning into and out of a low power state in an OS with a periodic timing scheme is saved in those timer ticks that are skipped.

Although the concept of a work dependent timing scheme is known experimentally, to our knowledge there is no commercially available OS, including open source OSs such as Linux, that comes equipped with a work dependent timing scheme. Even more importantly, to our knowledge, the few experimentally known OSs that do implement a work dependent timing scheme exercise only one power management state, if any at all, namely the least efficient power management state. The present invention solves this problem and demonstrates how a multiple of power management states may be utilized.

Low power states cannot be exercised effectively in a dynamic fashion without addressing system timing behavior. Known embedded processors, however, such as the Cirrus Logic® EP7211 and the Intel® StrongARM 1110 microprocessors, disable their internal hardware timers when they are in SLEEP state. Thus, the internal hardware timer is not available to handle timing or power management functions while the processor is in SLEEP state. Some other timer source is therefore necessary. These processors have another timer source: a real-time clock (RTC). The RTC timers, however, tend to have poor resolution compared to that of internal timers. For example, the internal timer of the Cirrus Logic® EP7211 is capable of delivering timing intervals from 2 microseconds (μsec) to 32 seconds (sec), whereas the RTC timer has a minimum resolution of 1 sec. The present invention overcomes the timing resolution problem.

Certain RTCs, such as the Cirrus Logic® and Strong ARM RTCs, present another problem. Consider the Cirrus Logic® RTC, which has a 1-sec timing resolution. That RTC is capable of generating interrupts only on absolute whole-second boundaries. The boundaries, or phases, cannot be adjusted, i.e., shifted in time. Thus, it is not possible to program the RTC to generate an interrupt in precisely 2 seconds, for example, from the current instantaneous time. The present invention overcomes problems caused by the RTC phase.

A system that takes advantage of a low power state while the processor is still running must also be able to handle interrupts from other sources besides the hardware timer. The present invention solves the problem of handling interrupts while a system is in a low power state, wherein the interrupts may be random, such as those generated by a user, a network, a sensor, or the like.

It should be noted that most computing systems use non-aggressive power management schemes, if they use any at all. Such power management schemes are well known to those who, for example, use Windows®- or Intel®-based computers or laptops and are described, for example, in U.S. Pat. No. 6,065,123 to Chou et al. The computer system of the Chou et al patent uses a power management apparatus that must detect when the computer system is going to enter the Standby low power mode: more specifically, the apparatus of Chou et al waits until one of three events occurs—namely, a user command, an application command or an inactivity timeout event—to trigger a power-saving feature that places the system into Standby mode. The power-saving module, called the InstantON servicing agent, is loaded and executed only after the operating system (OS) of the Chou computer system has loaded and is running. As any other loadable and memory resident module, the InstantON agent must periodically be scheduled by the OS to run in order to be able to detect whether a request has been made to enter Standby mode. One consequence of persistently scheduling the power-saving module of Chou et al is that the InstantON agent uses up available processing bandwidth and power, in addition to what the OS itself is already consuming. Furthermore, the computational overhead and slowness associated with signaling a low power event to or scheduling the InstantOn agent will necessarily limit the Chou apparatus in its ability to enter a low power state in a speedy fashion.

In contrast to computer systems that use non-aggressive power management schemes, many devices today would benefit from a much more aggressive power management scheme that is an inherent and tightly integrated part of the OS and which automatically and instantaneously exploits opportunities to conserve power by entering low power states within extremely short timing intervals. For example, pervasive devices with limited energy supplies such as batteries have experienced a long-felt need for a power management implementation that executes instantaneously, with no impact on available processor bandwidth. In addition, it would be advantageous to provide a power management method or apparatus that takes into consideration the power consumption of a system when it is in a low power state and/or when the system enters or exits a low power state.

Consequently, there is a need for an operating system, software system and/or method which is capable of exercising various low power states in a rapid dynamic fashion and in coordination with other timing requirements of the system. The description of the invention which follows details how this may be achieved.

It should be pointed out that any operating system or software system that has large enough timer interrupt intervals, whether the system is work dependent or not, and whether the timer interrupt is periodic or not, may take advantage of the following invention.

SUMMARY OF THE INVENTION

The present invention provides for a method and apparatus for managing power consumption of a processing unit having an operating system (OS) or software system and access to at least one hardware timer. The method may include steps for: determining a time period for which the software system is not expected to perform work; determining one of at least two low power states in which to put the processing unit in response to said time period; configuring the hardware timer to facilitate waking up the software system in time for the software system to perform expected work; transitioning the processing unit and the software system into said low power state; and transitioning the processing unit and the software system out of said low power state in response to a hardware interrupt. If the processing unit has access to at least two hardware timers, the method of the invention may determine which hardware timer to use to save the most power. For a software system with a periodic timer interrupt, the method determines which low power state to put the processing unit in based on reading a time interval remainder of the at least one hardware timer.

In determining which low power state to use, the invention may take into consideration the time the processing unit takes to enter or exit the low power state. The invention may also account for a minimum timing interval by which the hardware timer operates for generating the hardware interrupt. The energy to be spent while entering and/or exiting the low power state may also be taken into consideration when determining which low power state to put the processing unit in. The invention may also account for the energy to be spent in the low power state.

The software system of the processing unit may comprise a code section, such that execution of the software system returns to and remains with the code section in the time period during which the software system is not performing work. Furthermore, the software system may be an operating system.

The invention may be an article of manufacture comprising a machine readable medium containing one or more programs for managing power consumption of a processing unit having a software system and access to at least one hardware timer, wherein the article of manufacture comprises instructions for performing method steps as described above.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENT

Figure 1:
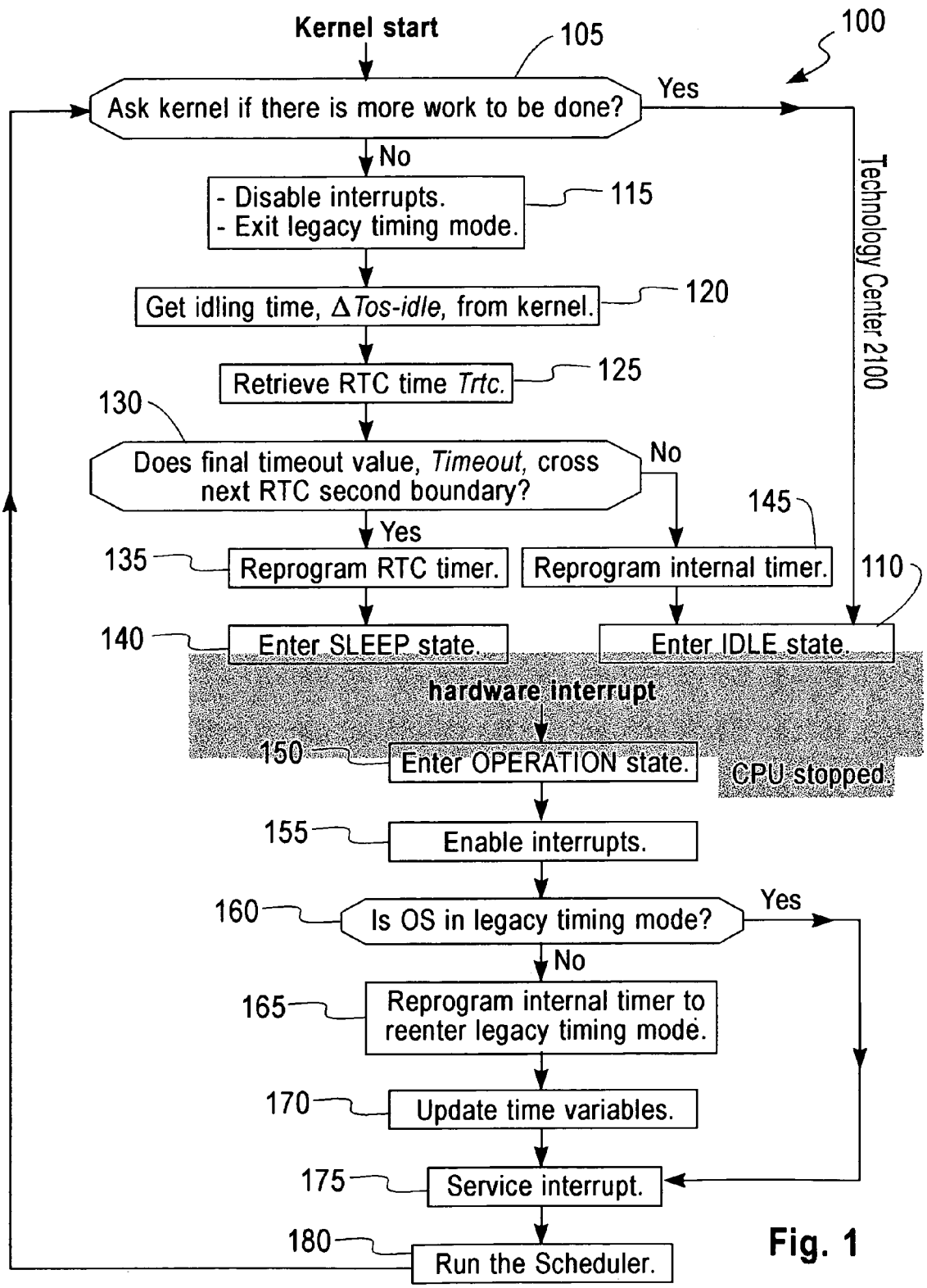
FIG. 1 is a flowchart illustrating a method used for managing processor power states in accordance with a preferred embodiment of the present invention.

As used in this specification and the appended claims, the term "work" or "work to be done" is defined as the execution of any piece of any software task, process, interrupt service routine, callback function, or the like.

As used in this specification and the appended claims, the term "processing unit," or simply "processor," is defined as a microprocessor, a microcontroller, a digital signal processor, or other device capable of executing instructions.

In a preferred embodiment of the invention, a processing unit preferably has two low power states, which shall be denoted as IDLE and SLEEP states. In the IDLE state, the clock to the CPU core is stopped. In the SLEEP state, the clock to most of the peripheral functional blocks on the processor is further stopped. When the processor is not in any of the power down states, the processor is in the OPERATION state. According to the preferred embodiment, only in the OPERATION state does the processor execute instructions. The SLEEP state is the most power efficient state. The IDLE state is the second-most power efficient state. The OPERATION state is the least power efficient state.

According to one embodiment of the present invention, a processor has at least two integrated timer facilities or resources. In a preferred embodiment, the processing unit has two hardware timers: an internal timer which is capable of providing comparatively small timer intervals, i.e., less than 1 second; and a real-time clock (RTC) timer, which provides comparatively large timer intervals and is able to produce timer interrupts only on whole second boundaries. Preferably, the internal timer is enabled in the IDLE state and disabled in the SLEEP state. The RTC timer may be enabled in both IDLE and SLEEP states. Both timers are enabled in the OPERATION state. Note that, although the RTC timer may be able to generate timer interrupts only on whole second boundaries, the RTC registers may be read to determine time with an accuracy that is much better than 1 second.

The time required to transition out of, or exit, SLEEP state into OPERATION state is denoted herein as $\Delta T_{exit}$. The time to transition out of, or exit, IDLE state into OPERATION state is preferably considered instantaneous, because this delay time tends to be insignificant compared to other processor delays and time durations, such as, for example, the "exit" delay time from SLEEP state. Also, the time required to transition into, or enter, IDLE and SLEEP states is preferably assumed to be instantaneous.

With respect to power requirements for entering and exiting the low power states, preferably the power consumption rates during these transition periods are no greater than the power consumption in the IDLE state.

Generally speaking, an operating system (OS) needs to wake up to execute instructions whenever there is work to be done. According to a preferred embodiment of the present invention, the OS or other software system supplies a Timing and Power Manager (TPM) with the amount of time the OS can remain idling, $\Delta T_{OS\text{-}idle}$, after which time the OS must be woken up to execute instructions. Note that $\Delta T_{OS\text{-}idle}$ may be modified by the TPM according to conversions to be performed with $\Delta T_{OS\text{-}idle}$, according to hardware timer register limitations, or according to other assumptions and operations that will be recognizable by those of ordinary skill in the art.

The instantaneous RTC time is retrieved by reading the RTC data registers. As used in this specification, the instantaneous RTC time is denoted as $T^{rtc}$. All time variables mentioned herein are preferably in units of seconds.

Before describing the present invention, the term "legacy timing mode" will be defined. Whenever an OS is performing work, as well as on initial startup of the OS, the OS timing methodology in effect is the default, or standard, periodic timing scheme. According to this default timing scheme, the OS may be interrupted in a periodic fashion by a hardware timer. As used in this specification, this timing scheme, or timing mode, is denoted as the "legacy timing mode." The legacy timing mode is useful for the following reasons. First, when there is work to be carried out, it is of greatest importance that various internal time variables be updated periodically so that the OS always has the accurate time handy when software components request the time. Second, and equally important, a multi-tasking OS has a scheduler that needs to count how long each process has been executing, so that it can properly switch between various processes, or applications, that are running in the system. Third, the OS may service various queues, or lists, that are awaiting the next timer interrupt.

FIG. 1 illustrates a preferred embodiment of the present invention in which a Timing and Power Manager (TPM) 100 coordinates with the OS, or other software system running on a processing unit. As depicted in the flow chart of FIG. 1, the Timing and Power Manager 100 may gain control of the OS whenever the OS returns from performing work.

In step 105, the TPM submits a request to the OS to determine if there is more work to be done. The OS may return a Yes or No in step 105. If a Yes is returned, the TPM puts the processor into the IDLE state in step 110. Putting the processor into IDLE state when there is work to be done may seem unintuitive. Certain types of work in an OS, however, may be awaiting on a queue which is to be parsed on the next legacy timer tick, rather than being serviced immediately. The OS is still in the legacy timing mode upon entering the IDLE state from step 105, it should be noted. Also, depending on what type of work needs to be performed, the OS may branch directly from step 105 to step 180, and bypass the IDLE state altogether.

If the OS returns a No in step 105, indicating that there is no work to be done, the TPM disables the OS from being interrupted and marks the OS as no longer being in the legacy timing mode (step 115).

After leaving legacy timing mode, the system enters a work dependent timing mode, in which a hardware timer will be reprogrammed to interrupt the processor at a specific time in the future when there is work to be done, and in which the processor is put into a low power state such as either SLEEP state or IDLE state. According to a preferred embodiment of the invention, the timer is programmed with an appropriate timeout interval to facilitate waking up the OS in time for it to perform work that needs to be done.

The processing unit may have access to more than one hardware timer resource. If that is the case, then before reprogramming a hardware timer, the TPM preferably determines which timer source should be used to save the most power. According to a preferred embodiment, the TPM determines which one of an internal timer or a RTC timer to use. For example, if a sufficiently long time interval is expected to pass before the processor has to do work, and the RTC timer is able to wake up the processor in time to perform that work, then the processor is put into the SLEEP state. If, on the other hand, the RTC timer is not able to wake up the processor in time to perform the work, then the internal timer is used, and the processor is put into the IDLE state.

According to the embodiment illustrated in FIG. 1, in step 120, the TPM requests from the OS the amount of time the OS may remain idling, $\Delta T_{OS\text{-}idle}$. Immediately thereafter, in step 125, the RTC time, $T_{rtc}$, is retrieved by reading the RTC data registers.

The TPM determines which timer source to use in step 130, preferably by first calculating the final hardware timeout value, $T_{timeout}$, as shown in Equation (1), $$T_{timeout} = T_{rtc} + \Delta T_{OS\text{-}idle} - \Delta T_{exit} \quad (1)$$

and then comparing the outcome to the next RTC second boundary as shown in Equation (2).

$$T_{timeout} \geq INT(T_{rtc}+1) \quad (2)$$

where INT(x) returns the integer of x.

If $T_{timeout}$ crosses the next RTC second boundary, i.e., if Equation (2) is true, then the RTC timer may be used to wake up the processor in time to perform work. The RTC timer is then reprogrammed in step 135, i.e., its current value is changed to reflect the appropriate timeout value INT ($T_{timeout}$), and the processor is put into SLEEP state in step 140. The reason for using the INT( ) function is that the RTC timer can be programmed to generate a timer interrupt only on a whole second boundary.

If the answer to the comparison in Equation 2 is false, then the low resolution timer or RTC timer cannot be used. Instead, the internal timer is reprogrammed with the OS idle time, $\Delta T_{OS\text{-}idle}$, in step 145, and the processor is put into IDLE state in step 110.

In an alternative embodiment, the timeout value may be modified to take into consideration the amount of time it takes to enter the low power state, $\Delta T_{enter}$, in addition to the time it takes to exit that state.

In another embodiment of the invention, the processing unit may have access to a single hardware timer. According to this embodiment, the TPM programs the single hardware timer with the appropriate timeout interval to facilitate waking up the operating system or software system from a low power state. For this embodiment, the relevant comparison to make to determine whether to enter the SLEEP or IDLE state is given in Equation (3), which overrides Equation (2):

$$\Delta T_{OS\text{-}idle} > \Delta T_{exit} + \Delta T_{enter} \quad (3)$$

If Equation (3) is true, then SLEEP state may be entered, and if Equation (3) is false then IDLE state may be entered.

Once the processor is put into SLEEP state (step 140) or into IDLE state (step 110), the clock to the CPU core is stopped, and no instructions are executed. The only event that may bring the CPU out of the low power state is a hardware interrupt. Hardware interrupts include timer interrupts and interrupts generated by a user interface, a network interface, a sensor interface, or the like, but are not limited thereto. Whatever the source of the interrupt is, however, it is assumed that the interrupt triggers the processor to transition out of the low power state and into OPERATION state. For example, the reprogrammed RTC timer or the reprogrammed internal timer may interrupt the processor and wake it up from SLEEP or IDLE state, respectively, when there is work to be done.

In step 150, the processor returns to OPERATION state and resumes the execution of instructions. Subsequently, the TPM reenables interrupts in step 155.

The consequence of reenabling interrupts is that the OS is triggered to handle interrupts. Those of ordinary skill in the art will recognize that in general, reenabling interrupts is a standard operating procedure in an interruptible processor and OS. According to the present invention, however, the TPM has to intercept the processing of the interrupt because the operating system or software system, at this point, may not be in its legacy timing mode. For example, the system may be in its legacy timing mode if it entered the IDLE state directly from step 105. If, however, the system entered the SLEEP state or the IDLE state after interrupts were disabled in step 115, then the system is not in legacy timing mode when interrupts are reenabled in step 155.

Accordingly, the TPM intercepts the processing of the interrupt by checking the timing mode in step 160. If the OS is not in its legacy timing mode, the TPM reprograms the internal timer in step 165 to reenter the legacy timing mode. When the internal timer is reprogrammed, it generates periodic timer interrupts as expected by the OS. In step 170, the TPM updates at least one time variable, such as the OS time. The interrupt service routine is finally entered in step 175.

If the outcome of step 160 is that the OS is already in legacy timing mode, the TPM proceeds directly to step 175, where the OS takes over the servicing of the interrupt. It should be noted that the step of servicing the interrupt, in step 175, is a standard procedure for most OSs, and that this is a step in which work may be carried out by the OS.

Optionally, work may also be carried out in a scheduler in step 180. This step may be entered upon returning from servicing the interrupt. Calling the scheduler, which is an OS function, is a standard operating procedure in most multi-tasking OSs. The scheduler may check process times to see if it is time to switch task context and launch another task. The scheduler may also check task queues and run the associated tasks. The scheduler may be entered other ways besides from step 175.

According to another embodiment, the OS has a periodic timer interrupt, the OS is constantly in legacy timing mode, and the TPM determines which low power state to enter based upon reading the remainder of the periodic hardware timer.

In another embodiment of the invention, the TPM preferably takes into consideration the energy and time required to enter and exit a low power state. This information is used to determine which low power state of the processing unit may be used, such that the system may be woken up in time to perform work to be done. The TPM may also take into consideration the energy and time spent in the low power state.

According to this embodiment, the average amounts of power required to enter and exit a low power state i are denoted as $P_{i,enter}$ and $P_{i,exit}$, respectively. The times required to enter and exit a low power state i are denoted as $\Delta T_{i,enter}$ and $\Delta T_{i,exit}$, respectively. The time spent in low power state i is denoted as $\Delta T_i$, and the average power consumed in low power state i is denoted as $P_i$. The TPM may then select the proper low power state based on the following comparison of energies in the number of low power states $N_{LPS}$:

$$E_{i,total} \leq E_{j,total}, j \neq i, j \in N_{LPS}, i \in N_{LPS} \quad (4)$$

In Equation (4), $E_{i,total}$ is the total energy consumed in exercising the ith low power state. $E_{i,total}$ may be expressed as, for example:

$$E_{i,total} = P_{i,enter} \cdot \Delta T_{i,enter} + P_i \cdot \Delta T_i + P_{i,exit} \cdot \Delta T_{i,exit} \quad (5)$$

Equation (4) indicates that in order to select low power state i, the total energy consumed when exercising low power state i must be smaller than or equal to the total energy consumed when exercising any one of the other possible low power states, and it must also be smaller than the total energy consumed if staying in the OPERATION mode for a time span of $\Delta T_{i,enter} + \Delta T_i + \Delta T_{i,exit}$. Equation (5) provides an exemplary definition of the total energy consumed in a low power state.

In another variation of the invention, the power consumed by an entire system during the enter and exit periods and while it is in the low power state is taken into account by the TPM.

In yet another implementation, there may be a minimum response time to an interrupt which prevents certain power states from being utilized, depending on how large the enter or exit time periods are for those power states.

Those of ordinary skill in the art will recognize that other expressions for total energy consumption in a low power state may well include the power consumption and response times of other components besides the processing unit, such as memory and/or storage components. It will also be understood by those of ordinary skill that the energy consumed by other components in relation to the processor may vary considerably depending upon the particular implementation.

The description of the present invention has been presented for purposes of illustration and description, and is not intended to be exhaustive or limited to the invention in the form disclosed. Many modifications and variations will be apparent to those of ordinary skill in the art. Although in the depicted examples an OS supplies a Timing and Power Manager for managing low power processor states, the present invention may be applied to a system that does not have an OS. For example, the Timing and Power Manager of the invention may be part of a software system for a device such as a cellular telephone, MP3 player or the like that performs specific tasks for which classical operating system services are not required.

Those of ordinary skill in the art will also recognize that the inventive method for managing power consumption of a processing unit is not necessarily part of an operating system or software system but rather may be a separate module. For example, the method of the invention may be a program of instructions executable by a machine, embodied in a program storage device readable by the machine. The invention may be embodied in an article of manufacture that has a processing unit, an embedded software system and access to at least one hardware timer, wherein the article of manufacture comprises a machine readable medium containing one or more programs that may implement the method described herein. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing power consumption of a computer system comprising:
   a processing unit, peripherals, a clock for the processing unit, a clock for most of the peripherals, a software system with a periodic timer interrupt, and access to at least one hardware timer, the method comprising steps of:
   determining a time period for which the software system is not expected to perform work;
   determining one of at least two low power states in which to put the processing unit in response to said time period; wherein the at least two low power states comprise an idle state wherein the clock for the processing unit is stopped and a sleep state wherein the clock for most of the peripherals is further stopped; wherein the step of determining one of at least two low power states in which to put the processing unit further comprises a step of:
   accounting for energy to be spent while entering and exiting said at least two low power states;
   reading a time interval remainder of the at least one hardware timer;
   configuring the at least one hardware timer to facilitate waking up the software system in time for the software system to perform expected work;
   transitioning the processing unit and the software system into said low power state; and
   transitioning the processing unit and the software system out of said low power state in response to a hardware interrupt.

2. The method of claim 1, wherein the step of determining one of at least two low power states in which to put the processing unit further includes accounting for the time the processing unit takes to enter said low power state.

3. The method of claim 1, wherein the step of determining one of at least two low power states in which to put the processing unit further includes:
   accounting for the time the processing unit takes to exit said low power state.

4. The method of claim 1, wherein the step of determining a low power state in which to put the processing unit further includes the step of:
   accounting for a minimum timing interval by which the hardware timer operates for generating the hardware interrupt.

5. The method of claim 1, wherein the step of determining one of at least two low power states in which to put the processing unit further includes the step of:
   accounting for the energy to be spent in said low power states.

6. The method of claim 1 wherein the software system comprises a code section, and wherein execution of the software system returns to and remains with the code section in the time period during which the software system is not performing work.

7. The method of claim 1, wherein the software system is an operating system.

8. A method for managing power consumption of a computer system comprising a processing unit, peripherals, a clock for the processing unit, a clock for most of the peripherals, a software system with a periodic timer interrupt, and access to at least two hardware timers, the method comprising steps of:
   determining a time period for which the software system is not expected to perform work;
   determining one of at least two low power states in which to put the processing unit in response to said time period, wherein the at least two low power states comprise an idle state wherein the clock for the processing unit is stopped and a sleep state wherein the clock for most of the peripherals is further stopped, wherein the step of determining one of at least two low power states in which to put the processing unit further comprises a step of:
      accounting for the energy to be spent while entering and exiting said two low power states;
   configuring one of the at least two hardware timers to facilitate waking up the software system in time for the software system to perform expected work; the hardware timers comprising an internal timer which is capable of providing comparatively small timer intervals, and a real-time clock timer, which provides comparatively large timer intervals and is able to produce timer interrupts only on whole second boundaries;
   reading a time interval remainder of at least one of the hardware timers;
   transitioning the processing unit and the software system into the one of at least two low power states; and
   transitioning the software system out of the one of at least two low power states in response to a hardware interrupt.

9. The method of claim 8, wherein the at least two power states comprise an idle state wherein the clock for the processing unit is stopped and a sleep state wherein the clock to most of the peripherals is further stopped; and further comprising the step of:
   determining which one of the at least two hardware timers to use based upon which one enables less power consumption.

10. The method of claim 8, wherein the step of determining one of at least two low power states in which to put the processing unit further includes:
   accounting for the time the processing unit takes to enter the one of at least two low power states.

11. The method of claim 8, wherein the step of determining one of at least two low power states in which to put the processing unit further includes:
   accounting for the time the processing unit takes to exit the one of at least two low power states.

12. The method of claim 8, wherein the step of determining one of at least two low power states in which to put the processing unit further includes the step of:
   accounting for a minimum timing interval by which the hardware timer operates for generating the hardware interrupt.

13. The method of claim 8, wherein the step of determining one of at least two low power states in which to put the processing unit further includes the step of:
   accounting for the energy to be spent in said low power states.

14. The method of claim 8, wherein the software system comprises a code section, and wherein execution of the software system returns to and remains with the code section in the time period during which the software system is not performing work.

15. The method of claim 8, wherein the software system is an operating system.

16. A method for managing power consumption of a computer system comprising a processing unit, peripherals, a clock for the processing unit, a clock for most of the peripherals, a processing unit having access to at least one hardware timer and having a software system with a periodic timer interrupt, the method comprising steps of:
   reading a time interval remainder of the at least one hardware timer;
   determining a time period, for which the software system is not expected to perform work, based upon reading the time interval remainder;
   determining one of at least two low power states in which to put the processing unit in response to said time period; wherein the at least two low power states comprise an idle state wherein the clock for the processing unit is stopped and a sleep state wherein the clock for most of the peripherals is further stopped, wherein the step of determining one of at least two low power states in which to put the processing unit further comprises the step of:
   accounting for the energy to be spent while entering and exiting said two low power states;
   transitioning the processing unit and the software system into the one of said low power states, and
   transitioning the processing unit and the software system out of the one of said low power states in response to a hardware interrupt.

17. The method of claim 16, wherein the step of determining one of at least two low power states in which to put the processing unit further includes one of:
   accounting for the time the processing unit takes to enter said low power state.

18. The method of claim 16, wherein the step of determining one of at least two low power states in which to put the processing unit further comprises a step of:
   accounting for the time the processing unit takes to exit said low power state.

19. The method of claim 16, wherein the step of determining one of at least two low power states in which to put the processing unit further includes the step of:
   accounting for the energy to be spent in said low power states.

20. The method of claim 16, wherein the software system is an operating system.

21. An article of manufacture comprising a machine readable medium containing one or more programs for managing power consumption of a computer system comprising a processing unit, peripherals, a clock for the processing unit, a clock for most of the peripherals, a software system with a periodic timer interrupt, and access to at least one hardware timer, the article of manufacture comprising:

first instructions for determining a time period for which the software system is not expected to perform work;

second instructions for determining one of at least two low power states in which to pat the processing unit in response to said time period; wherein the at least two low power states comprise an idle state wherein the clock for the processing unit is stopped and a sleep state wherein the clock for most of the peripherals is further stopped; wherein the second instructions further comprise instructions for accounting for the energy to be spent while entering and exiting said two low power states;

third instructions for reading a time interval remainder of the at least one hardware timer;

fourth instructions for configuring the hardware timer to facilitate waking up the software system in time for the software system to perform expected work;

fifth instructions for transitioning the processing unit and the software system into the said one of the at least two low power states; and sixth instructions for transitioning the processing unit and the software system out of said one of the at least two low power states in response to a hardware interrupt.

22. The article of manufacture of claim 21, further comprising:
  instructions for accounting for the time the processing unit takes to exit the one of at least two low power states.

23. The article of manufacture of claim 21, further comprising:
  instructions for accounting for a minimum timing interval by which the hardware timer operates for generating the hardware interrupt.

24. The article of manufacture of claim 21, further comprising:
  instructions for accounting for the energy to be spent in said one of at least two low power states.

25. The article of manufacture of claim 21, wherein the software system comprises a code section, and wherein execution of the software system returns to and remains with the code section in the time period during which the software system is not performing work.

26. A program storage device readable by machine, tangibly embodying a program of instructions executable by the machine to perform methods steps for managing power consumption of a computer system comprising a processing unit, peripherals, a clock for the processing unit, a clock for most of the peripherals, a software system with a periodic timer interrupt, and access to at least one hardware timer, said method steps comprising:
  determining a time period for which the software system is not expected to perform work;
  determining one of at least two low power states in which to put the processing unit in response to said time period; wherein the at least two power states comprise an idle state wherein the clock for the processing unit is stopped and a sleep state wherein the clock to most of the peripherals is further stopped; wherein the step of determining one of at least two low power states further comprises a step of accounting for the energy to be spent while entering and exiting said two low power states;
  reading a time interval remainder of the at least one hardware timer;
  configuring the hardware timer to facilitate waking up the software system in time for the software system to perform expected work;
  transitioning the processing unit and the software system into said one of two low power states; and
  transitioning the processing unit and the software system out of said one of two low power states in response to a hardware interrupt.

27. An article of manufacture for use in accordance with a computer system comprising a processing unit, peripherals, a clock for the processing unit, a clock for most of the peripherals, that has at least two low power states, and embedded software system with a periodic timer interrupt, and access to at least one hardware timer, the article comprising a machine readable medium containing one or more programs which when executed implement the steps of:
  determining a time period for which the software system is not expected to perform work;
  determining one of at least two low power states in which to put the processing unit in response to said time period; wherein the two power states comprise an idle state wherein the clock for the processing unit is stopped and a sleep state wherein the clock to most of the peripherals is further stopped; wherein the step of determining one of at least two low power states further comprises a step of accounting for the energy to be spent while entering and exiting said two low power states;
  reading a time interval remainder of the at least one hardware timer;
  configuring the hardware timer to facilitate waking up the software system in time for the software system to perform expected work;
  transitioning the processing unit and the software system into said low power state; and
  transitioning the processing unit and the software system out of said low power state in response to a hardware interrupt.

* * * * *